(12) United States Patent
Johnson et al.

(10) Patent No.: US 11,005,829 B1
(45) Date of Patent: May 11, 2021

(54) PROVIDING SECURE END-TO-END DATA ENCRYPTION BETWEEN DEVICES

(71) Applicant: Fuze, Inc., Boston, MA (US)

(72) Inventors: Keith Johnson, Cambridge, MA (US); Julio Viera, Brooklyn, NY (US); Joao Santos, Boston, MA (US)

(73) Assignee: Fuze, Inc., Boston, MA (US)

( * ) Notice: Subject to any disclaimer, the term of this patent is extended or adjusted under 35 U.S.C. 154(b) by 358 days.

(21) Appl. No.: 15/784,735

(22) Filed: Oct. 16, 2017

(51) Int. Cl.
*H04L 29/06* (2006.01)
*H04L 9/32* (2006.01)
*H04L 9/08* (2006.01)
*H04L 9/30* (2006.01)
*H04L 9/14* (2006.01)

(52) U.S. Cl.
CPC .......... *H04L 63/062* (2013.01); *H04L 9/0861* (2013.01); *H04L 9/14* (2013.01); *H04L 9/30* (2013.01); *H04L 9/3247* (2013.01); *H04L 63/0428* (2013.01)

(58) Field of Classification Search
CPC . H04L 9/3247; H04L 9/14; H04L 9/30; H04L 9/0861; H04L 63/0428; H04L 63/062
See application file for complete search history.

(56) References Cited

U.S. PATENT DOCUMENTS

| | | | | |
|---|---|---|---|---|
| 6,983,371 B1* | 1/2006 | Hurtado | ................... | G06F 21/10 380/255 |
| 7,110,984 B1* | 9/2006 | Spagna | ................... | G06Q 30/00 705/57 |
| 7,146,009 B2* | 12/2006 | Andivahis | ............... | H04L 63/06 380/277 |
| 7,698,745 B2* | 4/2010 | Pauker | ................... | H04L 9/3073 726/27 |
| 8,166,118 B1* | 4/2012 | Borghetti | ................ | H04L 51/12 709/206 |
| 9,071,421 B2* | 6/2015 | Oney | ................... | H04N 21/4627 |
| 9,137,214 B2* | 9/2015 | Oney | ................... | H04L 63/045 |
| 9,490,974 B2* | 11/2016 | Brown | ................... | H04L 9/0825 |
| 2003/0147536 A1* | 8/2003 | Andivahis | ............... | H04L 9/083 380/277 |
| 2005/0198170 A1* | 9/2005 | LeMay | ................... | H04L 63/045 709/206 |
| 2011/0040967 A1* | 2/2011 | Waller | ................... | G06F 21/10 713/161 |

(Continued)

OTHER PUBLICATIONS

Cisco, Cisco Spark Security and Privacy, White Paper, 15 pages, 2016. Retrieved from URL: https://www.cisco.com/c/dam/en/us/solutions/collateral/collaboration/cloud-collaboration/cisco-spark-security-white-paper.pdf.

(Continued)

*Primary Examiner* — James R Turchen
(74) *Attorney, Agent, or Firm* — McDermott Will & Emery LLP (57) ABSTRACT

Various aspects of the subject technology related to systems and methods for providing secure end-to-end data encryption between devices. In one aspect, a method includes encrypting data for a sending device using an encryption key. The encryption key is not stored on a server. The method includes decrypting the encrypted data transmitted from the sending device to a receiving device using a decryption key. The decryption key is also not stored on a server.

17 Claims, 6 Drawing Sheets

(56) References Cited

U.S. PATENT DOCUMENTS

| | | | | |
|---|---|---|---|---|
| 2011/0131411 | A1* | 6/2011 | Lin | H04L 45/306 |
| | | | | 713/168 |
| 2011/0188598 | A1* | 8/2011 | Lee | H04W 72/1278 |
| | | | | 375/267 |
| 2012/0297188 | A1* | 11/2012 | van der Linden | G06F 21/606 |
| | | | | 713/165 |
| 2012/0297189 | A1* | 11/2012 | Hayton | G06F 16/183 |
| | | | | 713/165 |
| 2012/0314854 | A1* | 12/2012 | Waters | H04L 9/3073 |
| | | | | 380/28 |
| 2013/0238715 | A1* | 9/2013 | Sanyal | H04L 51/00 |
| | | | | 709/206 |
| 2013/0318347 | A1* | 11/2013 | Moffat | H04L 9/0894 |
| | | | | 713/168 |
| 2015/0207897 | A1* | 7/2015 | Flack | G06F 16/00 |
| | | | | 709/213 |
| 2016/0080334 | A1* | 3/2016 | Hamilton | H04L 63/0428 |
| | | | | 713/168 |
| 2017/0180122 | A1* | 6/2017 | Smith | H04L 9/0833 |
| 2017/0195275 | A1* | 7/2017 | Domsch | H04L 51/38 |
| 2017/0366520 | A1* | 12/2017 | Templin | H04L 9/3268 |
| 2018/0020008 | A1* | 1/2018 | Schoof | H04L 63/062 |
| 2018/0167367 | A1* | 6/2018 | John | H04L 9/0825 |

OTHER PUBLICATIONS

WhatsApp, WhatsApp Encryption Overview, Technical White Paper, 10 pages, Nov. 17, 2016. Retrieved from URL: https://www.whatsapp.com/security/WhatsApp-Security-Whitepaper.pdf.

* cited by examiner

PROVIDING SECURE END-TO-END DATA ENCRYPTION BETWEEN DEVICES

TECHNICAL FIELD

The present disclosure generally relates to data encryption, and more specifically relates to secure end-to-end data encryption between a sending device and a receiving device.

BACKGROUND

A messaging application using end-to-end encryption attempts to transmit messages between a sender and receiver such that the sender and the receiver, rather than an unauthorized third party, can access the contents of the messages. However, end-to-end encryption does not eliminate the risk of an unauthorized third party accessing the contents of the messages.

SUMMARY

The present disclosure describes a system that provides end-to-end encryption of messages transmitted between devices such that access to the contents of the messages is limited to the sender of the message and an allowed entity. A sending device requests data encryption of unencrypted data. The encryption request also includes at least one of an identity of an entity that is allowed access to the unencrypted data or an identity of a group of entities. The unencrypted data is encrypted using the generated encryption key and the information about the allowed audience is encoded into the encrypted data. A receiving device requests data decryption of the encrypted data transmitted from the sending device to the receiving device. Information about the allowed audience encoded in the encrypted data is decoded. The encryption key is re-generated if the decoded information about the allowed audience indicates that the entity requesting decryption of the encrypted data through the receiving device is allowed access to the unencrypted data. The encrypted data is decrypted into unencrypted data using the re-generated encryption key.

According to one aspect of the present disclosure, a computer-implemented method for secure end-to-end data encryption between devices is provided. The method includes receiving, from a sending device, an encryption request that includes unencrypted data and information about an allowed audience. The information about the allowed audience includes at least one of an identity of one or more entities or an identity of a group of entities that are allowed to access the unencrypted data. The method includes generating an encryption key based on a first data key of a plurality of data keys received, from a key management entity. The key management entity is a third party entity that is separate and independent of the sending device and an entity that generates the encryption key. The method includes encrypting the unencrypted data into encrypted data using the encryption key and encoding the information about the allowed audience into the encrypted data. The method includes receiving, from a receiving device, a decryption request that includes the encrypted data transmitted from the sending device to the receiving device. The method includes decoding the information about the allowed audience encoded in the encrypted data in response to receiving the decryption request from the receiving device. The method includes re-generating the encryption key if the decoded information about the allowed audience indicates that an entity requesting decryption of the encrypted data through the receiving device is allowed access to the unencrypted data. The method includes decrypting the encrypted data into unencrypted data using the re-generated encryption key.

According to one embodiment of the present disclosure, a system is provided for secure end-to-end encryption between devices that includes one or more processors and a computer-readable storage medium coupled to one or more processors, the computer-readable storage medium including instructions. The instructions cause the one or more processors to receive, from a sending device, an encryption request comprising unencrypted data and information about an allowed audience comprising the identity of one or more entities or the identity of a group of entities that are allowed to access the unencrypted data. The instructions also cause the one or more processors to generate an encryption key by receiving, from a key management entity, a plurality of data keys based on the encryption request, and generate the encryption key based on a first data key of the plurality of data keys, wherein the key management entity is a third party entity that is separate and independent of the sending device and an entity that generates the encryption key. The instructions also cause the one or more processors to encrypt the unencrypted data into encrypted data using the encryption key and, encode the information about the allowed audience into the encrypted data. The instructions cause the one or more processors to receive, from a receiving device, a decryption request comprising the encrypted data transmitted from the sending device to the receiving device. The instructions cause the one or more processors to, in response to receiving the decryption request from the receiving device, decode the information about the allowed audience encoded in the encrypted data. The instructions cause the one or more processors to, if the decoded information about the allowed audience indicates that an entity requesting decryption of the encrypted data through the receiving device is allowed access to the unencrypted data, re-generate the encryption key. The instructions also cause the one or more processors to decrypt the encrypted data into unencrypted data using the re-generated encryption key.

According to one aspect of the present disclosure, a non-transitory machine-readable storage medium is provided including machine-readable instructions that, when executed by a processor, cause the processor to perform operations that include receiving, from a sending device, an encryption request including unencrypted data. The unencrypted data includes information about an allowed audience including at least one of an identity of one or more entities or an identity of a group of entities that are allowed to access the unencrypted data. The operations include generating an encryption key based on a first data key of a plurality of data keys received, from a key management entity. The key management entity is a third party entity that is separate and independent of the sending device and an entity that generates the encryption key. The operations include encrypting the unencrypted data into encrypted data using the encryption key and encoding the information about the allowed audience into the encrypted data. The operations include receiving, from a receiving device, a decryption request including the encrypted data transmitted from the sending device to the receiving device. The operations include, in response to receiving the decryption request from the receiving device, decoding the information about the allowed audience encoded in the encrypted data. The operations include re-generating the encryption key when the decoded information about the allowed audience indicates that an entity requesting decryption of the encrypted data through the receiving device is allowed access to the unencrypted data. The operations include decrypting the encrypted data into unencrypted data using the re-generated encryption key.

According to one aspect of the present disclosure, a system is provided that includes means for providing secure end-to-end encryption between devices. The system includes means for receiving, from a sending device, an encryption request that includes unencrypted data and information about an allowed audience. The information about the allowed audience includes the identity of one or more entities or the identity of a group of entities that are allowed to access the unencrypted data. The system includes means for generating an encryption key by receiving, from a key management entity, a plurality of data keys based on the encryption request and generating the encryption key based on a first data key of the plurality of data keys. The key management entity is a third party entity that is separate and independent of the sending device and an entity that generates the encryption key. The means for generating the encryption key is further configured to encrypt the unencrypted data into encrypted data using the encryption key and encode the information about the allowed audience into the encrypted data. The system includes means for receiving, from a receiving device, a decryption request that includes the encrypted data transmitted from the sending device to the receiving device. The system includes means for decoding the information about the allowed audience encoded in the encrypted data in response to receiving the decryption request from the receiving device. The system includes means for re-generating the encryption key if the decoded information about the allowed audience indicates that an entity requesting decryption of the encrypted data through the receiving device is allowed access to the unencrypted data. The system includes means for decrypting, the encrypted data into unencrypted data using the re-generated encryption key.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Data encryption converts or scrambles the data into an unintelligible format and encrypts or "locks" the data so that only authorized parties can access the contents of the data by decrypting or "unlocking" the data. For example, when a message is transmitted over a network, such as the Internet, encryption or "locking" of the message prevents the message from being read by unauthorized third parties. With some types of data encryption, the message may be decrypted or "unlocked" in transit, for example, when it reaches a service provider's server where the contents of the message may be accessed by the service provider. With end-to-end encryption, the data is encrypted on the sender's device and is not decrypted until it reaches the recipient's device. Therefore, with end-to-encryption, the message may reach a service provider's server in encrypted form and the contents of the message will not be accessible by the service provider. End-to-end encryption is based on the generation of cryptographic key pairs, such as a public key for "locking" or encrypting data and a private key for "unlocking" or decrypting data that is encrypted with the public key, which are generated on each client device. A cryptographic key is a string of bits used by an encryption/decryption algorithm to transform the unencrypted data into encrypted data and vice versa. The public key does not have to be secure and is typically stored on a server so that it is available to the public. The private key is stored on the client's device. The sender of a message encrypts or "locks" a message using the recipient's public key. The recipient receives the encrypted message and decrypts or "unlocks" the message using their private key which resides on the recipient's device.

The disclosed system and method provides secure end-to-end encryption of data that is transmitted between a sender and a receiver. Implementations of the disclosed system and method do not rely solely on key pairs (although key pairs may also be generated in order to sign and authenticate the data) for encrypting and decrypting the data transmitted between the devices. Rather, the disclosed system and method generates encryption and decryption keys and optionally, private and public key pairs, without storing them on a server. Access to the encryption and decryption keys is controlled based on an allowed audience that is specified for each of the keys. The disclosed system and method also allows services and entities to be configured as "trusted" services and entities that require authentication in order to have privileged access to the encryption or decryption keys.

The disclosed system addresses a problem in end-to-end data encryption between devices, which is a problem specifically arising in the realm of computer technology, by providing a solution also rooted in computer technology, namely, by generating encryption and decryption keys and optionally, public/private key pairs, without storing them on a server, thereby ensuring that the encryption and decryption keys do not become accessible to an unauthorized third party that could use them to access the contents of the messages transmitted between devices. The disclosed system also provides security by controlling the access to the keys based on a specified allowed audience. Finally, the disclosed system allows services and entities to be configured as "trusted" services and entities such that the services and entities require successful authentication in order to have privileged access to the encryption or decryption keys.

Although certain examples provided herein may describe a user's information being stored in memory, each user must grant explicit permission for such user information to be stored. The explicit permission may be granted using privacy controls integrated into the disclosed system. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

Figure 1:
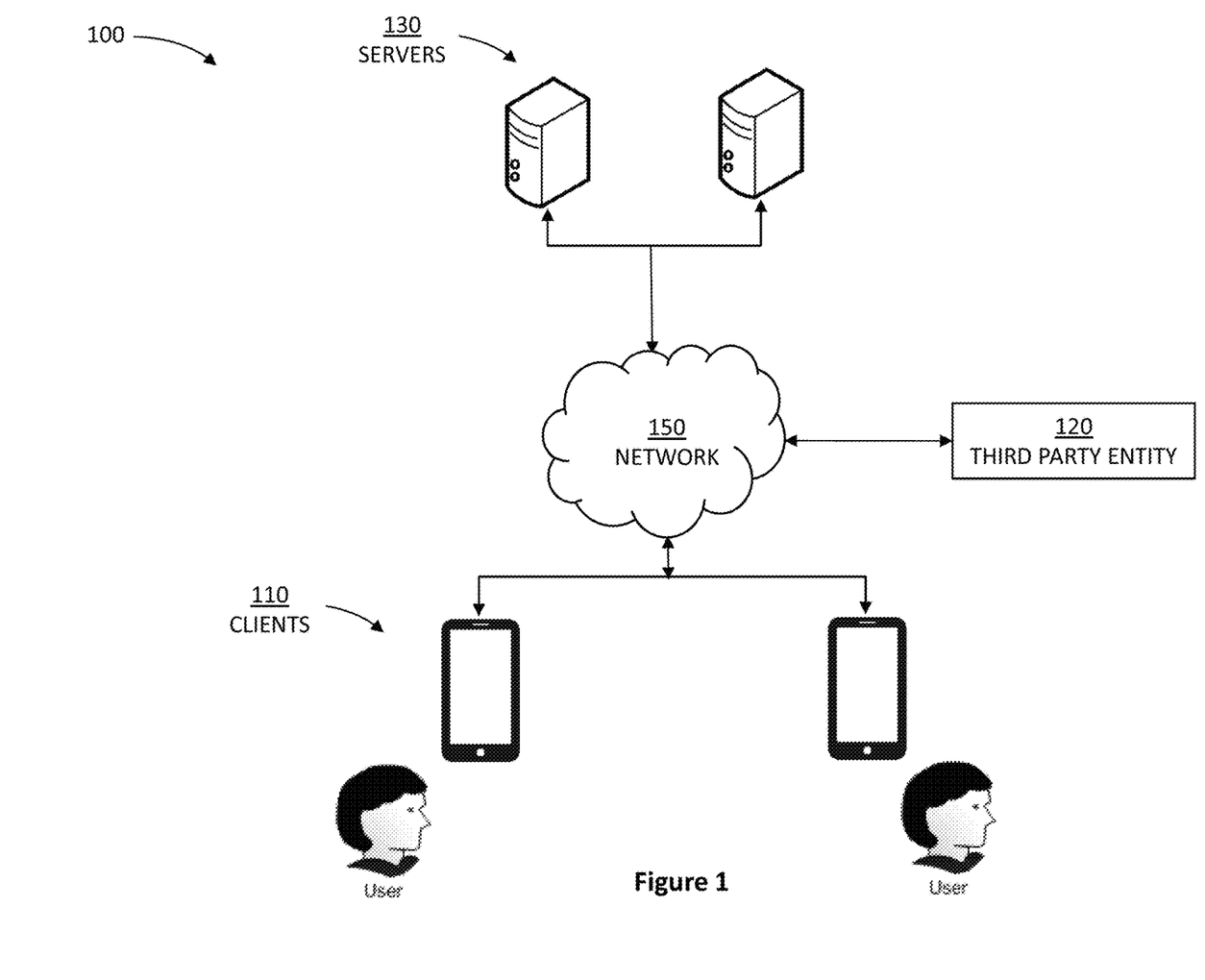
FIG. 1 illustrates an example architecture for providing secure end-to-end data encryption of between devices suitable for practicing some implementations of the disclosure.

FIG. 1 illustrates an example architecture 100 for providing secure end-to-end data encryption between devices suitable for practicing some implementations of the disclosure. The architecture 100 includes servers 130 and clients 110 connected over a network 150. One of the many servers 130 is configured to host a secure end-to-end encryption system. The disclosed secure end-to-end encryption system provides secure end-to-end encryption and decryption of data, such as messages, transmitted between the clients 110 over the network 150. As such, the disclosed system can, for example, generate an encryption key in response to receiving an encryption key request from one of the clients 110 and generate a decryption key in response to receiving a decryption request from one of the clients 110. The architecture 100 also includes a third party entity 120 that is separate and independent of the clients 110 and the servers 130. The secure end-to-end encryption system communicates with the third party entity 120 over the network 150 in order to generate encryption and decryption keys for the clients 110. The clients 110 encrypt unencrypted messages transmitted between the clients 110 and decrypt the encrypted messages transmitted between the clients 110. For purposes of load balancing, multiple servers 130 can host the secure end-to-end encryption system.

The servers 130 can be any device having an appropriate processor, memory, and communications capability for providing the secure end-to-end encryption system. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. In certain aspects, one or more of the servers 110 can be a cloud computing server of an infrastructure-as-a-service (IaaS) and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example Secure End-to-End Data Encryption System

Figure 2:
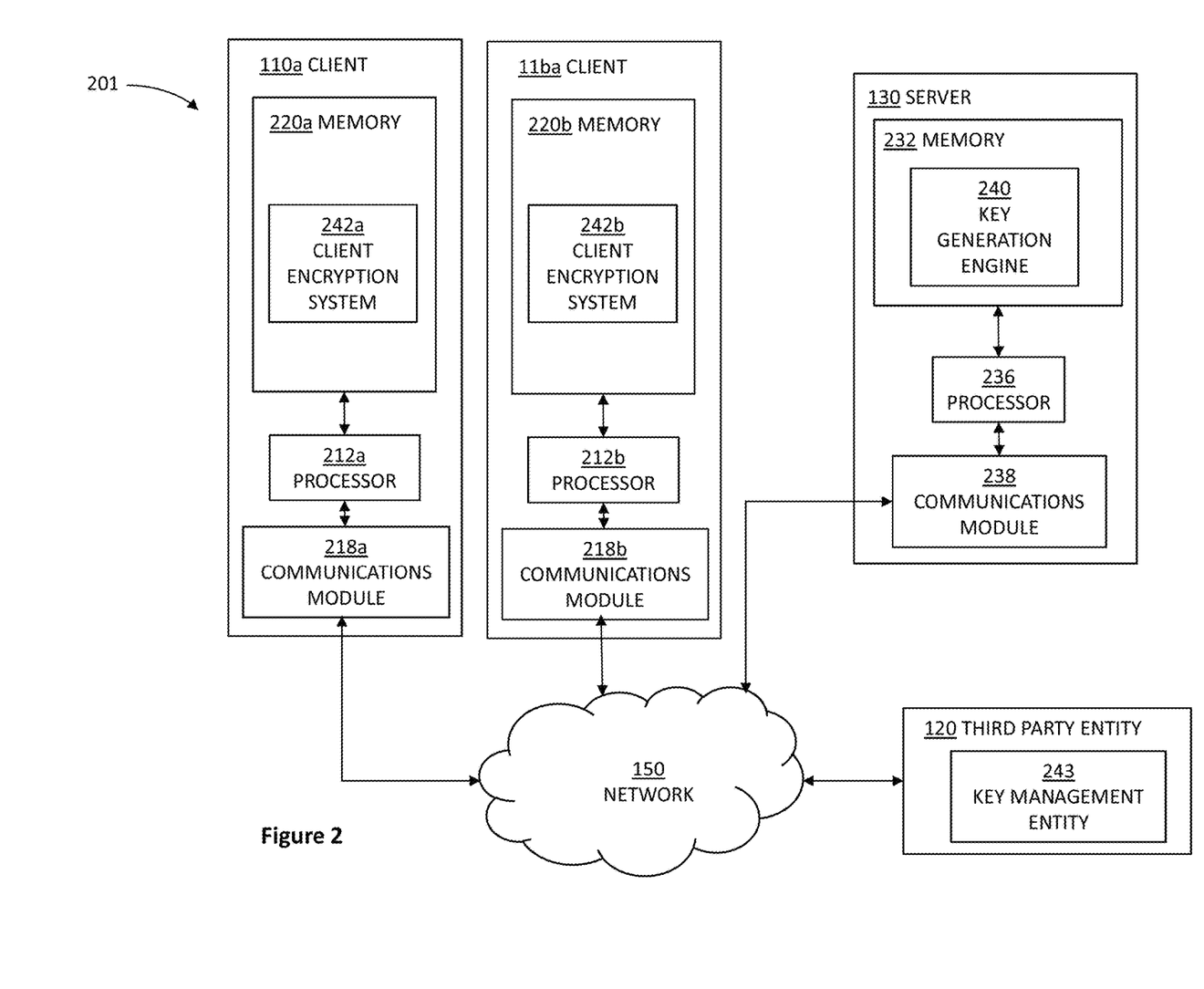
FIG. 2 is a block diagram illustrating an example first server, a first client and a second client in the architecture of FIG. 1 according to certain aspects of the disclosure.

FIG. 2 is a block diagram 200 illustrating an example server 130, a first client 110a and a second client 110b in the architecture 100 of FIG. 1 according to certain aspects of the disclosure. The first client 110a, the second client 110b and the server 130 are connected over the network 150 via their respective communications modules 218a, 218b and 238. The communications modules 218a, 218b and 238 are configured to interface with the network 150 to send and receive information, such as data, requests, responses, and commands to other devices on the network 150. The communications modules 218a, 218b and 238 can be, for example, modems or Ethernet cards.

The server 130 includes a processor 236, a communications module 238 and a memory 232. The memory 232 of the server 130 includes a key generation engine 240. The processor 236 of the server 130 is configured to execute instructions, such as instructions physically coded into the processor 236, instructions received from software in memory 240, or a combination of both.

The first and second client 110a and 110b include the processors 212a and 212b respectively, the communications modules 218a and 218b respectively and the memories 220a and 220b respectively. The memories 220a and 220b include the client encryption systems 242a and 242b. The first client 110a and second client 110b also each include an input device, such as a keyboard or mouse, and an output device, such as a display. The processor 212a of the first client 110a is configured to execute instructions, such as instructions physically coded into the processor 212a, instructions received from software in memory 240a, or a combination of both. The processor 212b of the second client 110b is configured to execute instructions, such as instructions physically coded into the processor 212b, instructions received from software in memory 240b, or a combination of both.

The client encryption system 242a of the first client 110a may be a module executed by the processor 212a that is configured to encrypt data in response to receiving an encryption request. The encryption request includes unencrypted data and information about an allowed audience comprising at least one of an identity of one or more entities (e.g. users) or an identity of a group of entities that are allowed to access the unencrypted data. The processor 212a of the first client 110a, using the client encryption system 242a, authenticates the sender of the encryption request. In some implementations, the sender of the encryption request is a device associated with the first client 110a. In some implementations, the sender of the encryption request is an application running on the first client 110a. The sender of the encryption request is authenticated by the server 130. In response to the sender of the encryption request being successfully authenticated, an encryption key is requested. In some implementations, the sender of the encryption request is a user associated with the first client 110a. In some implementations, a first user can login to a device associated with the first client 110a and send an encryption request using an application running on the first client 110a. In response to the first user being successfully authenticated by the server 130, an encryption key is generated by the server 130. At some point, the first user can logout of the device associated with the first client 110a and a second user can login to the device associated with the first client 110a. The second user can send an encryption request using the application running on the first client 110a. In response to the second user being successfully authenticated by the server 130, an encryption key is generated by the server 130.

The key generation engine 240 of the server 130 may be a module executed by the processor 236 that is configured, in response to receiving an encryption key request or a decryption key request, to generate an encryption key or a decryption key respectively based on interfacing with the key management entity 243. The key management entity 243 is associated with a third party entity 120 that is separate and independent of the first client 110a, the second client 110b and the server 130. In response to receiving a request for an encryption key from the client encryption system 241a of the first client 110a, the processor 236 of the server 130, using the key generation engine 240, receives, from the key management entity 243, a plurality of data keys based on the encryption key request. The processor 236, using the key generation engine 240, generates an encryption key based on a first data key of the plurality of data keys received from the key management entity 243. The processor 236 of the server 130 transmits the encryption key generated by the key generation engine 240 to the client encryption system 242a of the first client 110a. The server 130 also generates a header based on a second data key of the plurality of data keys received from the key management entity 243. The information about the allowed audience is encoded into the header. The processor 236 of the server 130 transmits the header to the client encryption system 241a of the first client 110a.

The processor 212a of the first client 110a, using the client encryption system 242a, encrypts the unencrypted data into encrypted data using the encryption key received from the server 130. The processor 212a, using the client encryption system 242a, prepends the header with encoded information about the allowed audience to the encrypted data. The first client 110a transmits the encrypted data to the second client 110b.

The client encryption system 242b of the second client 110b may be a module executed by the processor 212b that is configured to decrypt encrypted data in response to a decryption request. The processor 212b, using the client encryption system 242b, receives a decryption request that includes the encrypted data transmitted from the first client 110a to the second client 110b. The processor 236 of the server 130, authenticates the sender of the decryption request. In response to successfully authenticating the sender of the decryption request, the processor 236 of the server 130 generates a decryption key.

The processor 236 of the server 130, receives a decryption key request from the authenticated second client 110b. In response to receiving a request for a decryption key, the processor 236 of the server 130, using the key generation engine 240, receives, from a key management entity 243, a plurality of data keys based on the decryption key request. The processor 236 of the server 130 also decodes the information about the allowed audience encoded in the header. The processor 236, using the key generation engine 240, generates a decryption key (or re-generates the encryption key) based on a data key of the plurality of data keys received from the key management entity 243. If the decoded information about the allowed audience indicates that the entity requesting decryption of the encrypted data through the client 110b is allowed access to the contents of the unencrypted data, the processor 236, using the key generation engine 240, re-generates the encryption key (or generates the decryption key). The processor 236 of the server 130 transmits the decryption key (or re-generated encryption key) to the second client 110b.

The processor 212b of the second client 110b, using the client encryption system 242b, receives the decryption key from the server 130 and decrypts the encrypted data into unencrypted data using the re-generated encryption key (or generated decryption key) received from the server 130.

Figure 3:
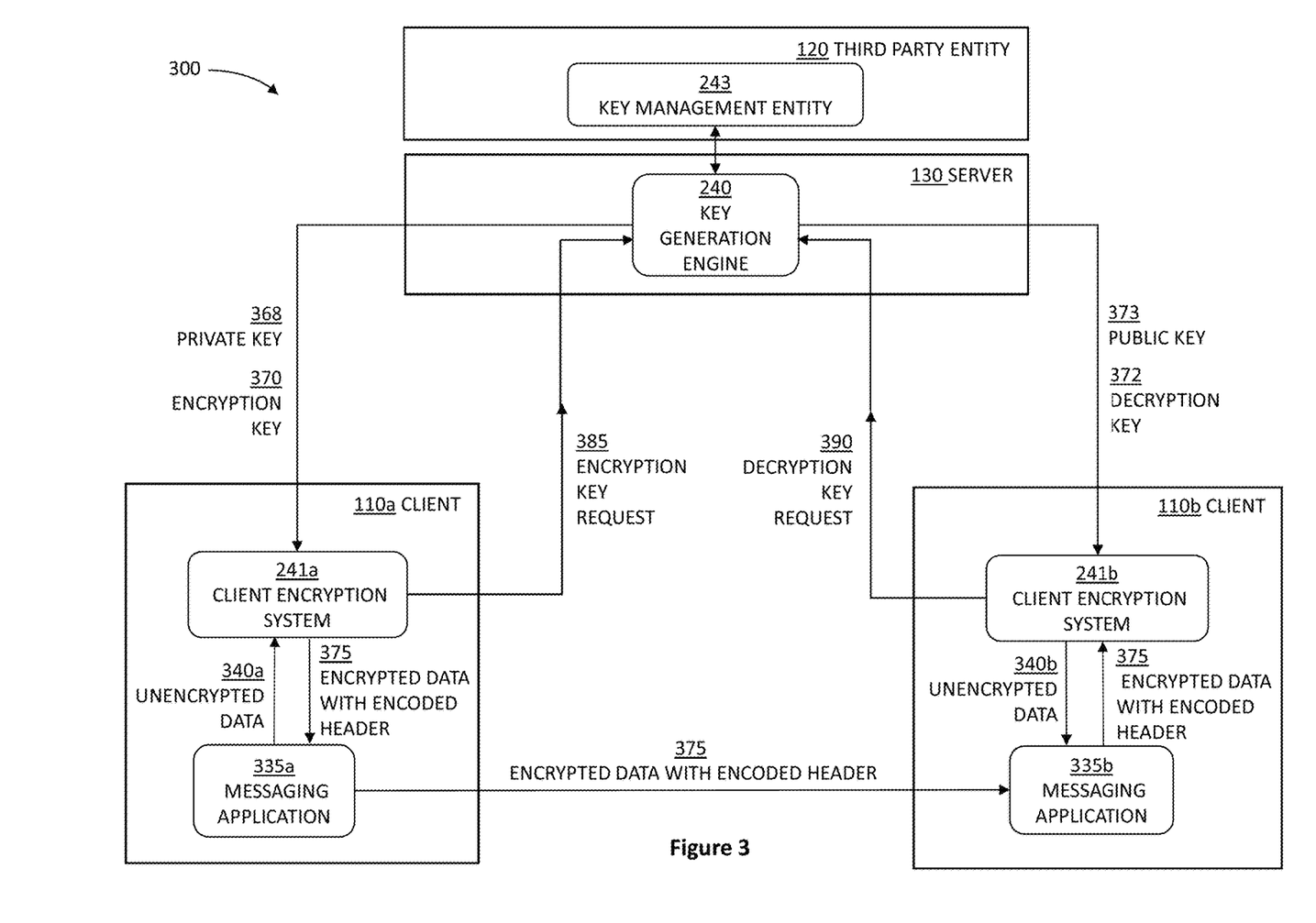
FIG. 3 illustrates a data flow diagram for an end-to-end encryption system according to certain aspects of the disclosure.

FIG. 3 illustrates a data flow diagram 300 for an end-to-end encryption system according to certain aspects of the disclosure. As shown in FIG. 3, a client encryption system 241a encrypts unencrypted data 340a into encrypted data (such as encrypted data with encoded header 375) based on receiving an encryption request from a messaging application 335a running on the first client 110a. The unencrypted data 340a is encrypted using an encryption key 370 generated by a key generation engine 240 based on a plurality of data keys received from a key management entity 243. A client encryption system 241b decrypts the encrypted data transmitted from the first client 110a to the second client 110b into unencrypted data 340b based on receiving a decryption request from the messaging application 335b running on the second client 110b. The encrypted data is decrypted using a decryption key 372 generated by the key generation engine 240 based on a plurality of data keys received from the key management entity 243.

The client encryption system 241a may be physically coded with instructions that, when executed, encrypts the unencrypted data 340a based on receiving an encryption request from the first client 110a. The unencrypted data 340a may be a message that is generated by an application such as the messaging application 335a loaded on the device of the first client 110a. The encryption request includes the unencrypted data 340a and information about an allowed audience. The information about an allowed audience includes at least one of an identity of one or more entities or an identity of a group of entities that are allowed to read or access the contents of the unencrypted data 340a. The sender of the encryption request is authenticated by interfacing with the server 130. If the sender of the encryption request authenticates successfully, the client encryption system 241a encrypts the unencrypted data 340*a* into encrypted data using an encryption key 370 received from the key generation engine 240. The client encryption system 241*a* also receives from the server 130, a header encoded with information about the allowed audience. The client encryption system 241*a* prepends the encrypted data with the encoded header received from the key generation engine 240. The encrypted data with encoded header 375 is transmitted by the client encryption system 241*a* to the messaging application 335*a*. The encrypted data with encoded header 375 is transmitted by the first client 110*a* to the second client 110*b*.

In some implementations, the identity of the entity that is allowed to read or access the contents of the unencrypted message 340*a* may be the identity of a user or an application. In some implementations, the identity of the entity that is allowed to read or access the contents of the unencrypted message 340*a* may be the identity of a group. The group may include one or more members. Each member may be a user or an application. The members of the group may include one or more groups. In some implementations, the encryption request includes an encryption algorithm for encrypting the unencrypted data 340*a* into encrypted data. In some implementations, the encryption request includes an application context. In some implementations, the encryption request may include a signing key request for a private or signing key 368 for signing the unencrypted data on behalf of the sender. The signing key request may specify an algorithm for generating the private or signing key 368. The signing key request may also specify a length of the signing key.

The key generation engine 240 may be physically coded with instructions which, when executed, generates an encryption key 370 based on an encryption key request 385 received from the client encryption system 241 and a plurality of data keys received from the key management entity 243. The encryption key request 385 includes the information about an allowed audience. The key management entity 243 is a third party entity that is separate and independent of the first client 110*a* and the key generation engine 240. The key generation engine 240 generates the encryption key 370 based on a first data key of the plurality of data keys received from the key management entity 243. The server 130 transmits the generated encryption key 370 to the first client 110*a*. The server 130 also generates a header based on a second data key of the plurality of data keys received from the key management entity 243. The server 130 encodes the information about the allowed audience into the header. The server 130 transmits the generated encoded header is to the first client 110*a*.

In some implementations, the data keys received from the key management entity 243 are based on an identity of the entity requesting encryption of the unencrypted data 340*a*. In some implementations, the data keys received from the key management entity 243 are based on the encryption algorithm, the application key context and/or the information about the allowed audience. In some implementations, the data keys received by the key generation engine 240 from the key management entity 243 include a cipher text data key and a plain text data key. The key generation engine 240 generates an encryption seed based on at least one data key. The key generation engine 240 generates an encryption key 370 based on the generated encryption seed. In some implementations, the encryption seed may be generated based on the information about the allowed audience. In some implementations, the encryption key 370 includes an expiration date that indicates a time period during which the encryption key 370 is valid. In some implementations, the key generation engine 240 generates a private or signing key 368 based on the encryption seed and the signing key algorithm. In some implementations, the private key 368 includes an expiration date that indicates a time period during which the private key 368 is valid.

The client encryption system 241*a* is configured to encrypt the unencrypted data 340*a* using a received encryption key 370. In some implementations, the encryption key 370 may include an expiration date indicating whether the encryption key 370 is valid and the client encryption system 241*a* encrypts the unencrypted data 340 into encrypted data if the expiration data indicates that the encryption key 340 is valid. The client encryption system 241*a* is also configured to prepend an encoded header received from the server 130. The encoded header includes the identity of an entity that is allowed to access the contents of the unencrypted data 340*a* (i.e. the identity of the entity that is allowed to request decryption of the encrypted data) into the encrypted data. In some implementations, the encoded header includes a geographical region associated with the key management entity 243, the encryption algorithm used to generate the encryption key 370 and/or the application context. In some implementations, the encoded header can be encrypted by the server 130 in order to prevent visual inspection of the information included in the header. The server 130 transmits the encoded header to the client encryption system 241*a*. The client encryption system 241*a* prepends the encoded header to the encrypted data resulting in an encrypted data with encoded header 375. The first client 110*a* transmits the encrypted data with encoded header 375 to the second client 110*b*. The encryption key 370 is not provided to the second client 110*b*. The encryption key 370 is also not stored by the key generation engine 240 or the client encryption system 241*a*.

The client encryption system 241*b* may be physically coded with instructions which when executed, decrypts encrypted data transmitted from the first client 110*a* to the second client 110*b*. The encrypted data with encoded header 375 may be received by a messaging application 335*b* running on the second client 110*b* as shown in FIG. 2. The client encryption system 242*b* receives, from the messaging application 335*b*, a decryption request that includes the encrypted data with encoded header 375 transmitted from the first client 110*a* to the second client 110*b*. The sender of the decryption request is authenticated in order to determine whether that the sender of the decryption request is allowed to request decryption of the encrypted data with encoded header 375. The sender of the decryption request is authenticated by the server 130. The client encryption system 242*b* extracts the encoded header from the encrypted data if the sender of the decryption request is authenticated and sends a decryption key request 390 to the key generation engine 240. The decryption key request 390 includes the extracted encoded header.

The key generation engine 240 may be physically coded with instructions which, when executed, generates a decryption key 372 based on a decryption key request 390 received from the client encryption system 241*b*. The decryption key request 390 includes an encoded header. Information about an allowed audience is decoded from the encoded header. The key generation engine 240 retrieves a plurality of data keys from the key management entity 243. In some implementations, the plurality of data keys are based on the decoded information about the allowed audience. If the decoded information about the allowed audience indicates that the entity requesting decryption of the encrypted data with encoded header 375 through the second client 110*b* is allowed access to the contents of the unencrypted data 340a, the key generation engine 240 generates a decryption key 372 based on the data keys received from the key management entity 243. The client encryption system 241b of the second client 110b decrypts the encrypted data into unencrypted data 340b using the re-generated encryption key (or generated decryption key 372). The client encryption system 340b transmits the unencrypted data 340b to the messaging application 335b of the second client 110b.

In some implementations, the decoded information about the allowed audience in the encrypted data with encoded header 375 may include an identity of a group of entities. In some implementations, the key generation engine 240 is configured to re-generate the encryption key (or generate the decryption key) 372 in response to determining that the entity requesting access to the encrypted data through the second client 110b is a member of the identified group of entities. If the entity requesting decryption of the encrypted data through the second client 110b is allowed access to the contents of the unencrypted data, the key generation engine 240 re-generates the encryption key (or generates the decryption key) 372. In some implementations, each of the one or more entities that is allowed to access the unencrypted data may be a user or an application. In some implementations, each entity of the group may have an owner role or a publisher role and the entity requesting access to the encrypted data through the second client 110b is allowed to access the unencrypted data if the entity is a member of the group and the entity has a publisher role.

In some implementations, the client encryption system 241a of the first client 110a may be configured to sign the unencrypted data 340a using a signature of an entity that is requesting encryption of the unencrypted data 340a through the first client 110a. The signature can be generated using a private key that corresponds to the entity that is requesting encryption through the first client 110a. The client encryption system 241b of the second client 110b can be configured to verify the signature of the unencrypted data 340b using a public key 373. Upon receiving the encrypted data with encoded header from the first client 110a, the client encryption system 241b of the second client 110b can verify the unencrypted data 340b using the public key 373.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4A:
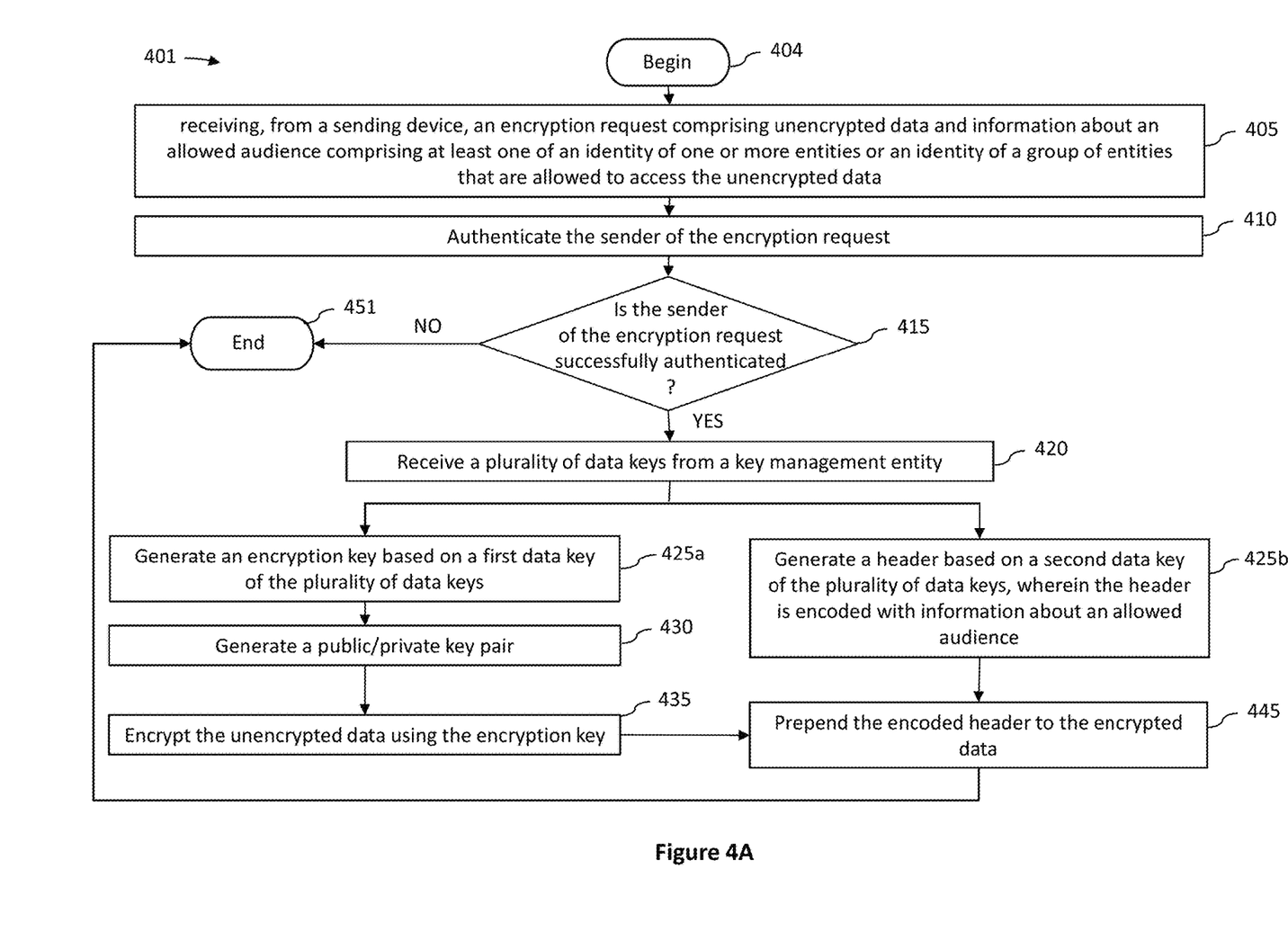
FIG. 4A sets forth an example process for encrypting unencrypted data using the example end-to-end encryption system shown in FIG. 3.

FIG. 4A illustrates an exemplary process 401 for encrypting data using the exemplary first and second clients 110a and 110b and the end-to-end encryption system of FIG. 3. While FIG. 4A is described with reference to FIG. 3, it should be noted that the process steps of FIG. 4A may be performed by other systems. The process 401 begins by proceeding from step 404 to step 405 when a data encryption request is received from a sending device to encrypt unencrypted data. In step 410, the sender of the encryption request is authenticated. In step 415, if the sender of the encryption request is not successfully authenticated, the process 401 ends at step 451. In step 415 if the sender of the encryption request is successfully authenticated, the process proceeds to step 420 in which a plurality of data keys are generated from a key management entity. In step 425a, an encryption key is generated based on a first data key of the plurality of data keys. In step 425b, a header is generated based on a second data key of the plurality of data keys, wherein the header is encoded with information about the allowed audience. In step 430, a public/private key pair is generated. In step 435, the unencrypted data is encrypted using the encryption key. In step 445, the encoded header is prepended to the encrypted data.

FIG. 4A sets forth an exemplary process for encrypting data using the example end-to-end encryption system shown in FIG. 3. An example will now be described using the exemplary process 401 of FIG. 4A, the end-to-end encryption system of FIG. 3, a sending smartphone as the exemplary client 110a and a receiving smartphone as the exemplary client 110b.

The process 401 begins by proceeding from step 404 to step 405 when the user of the smartphone 110a generates an unencrypted message as the unencrypted data 340a. The unencrypted message 340a is composed by the user of the sending smartphone 110a to the user of the receiving smartphone 110b via a messaging application 335a running on the sending smartphone 110a. In step 405, a data encryption request is received by the client encryption system 241a from the messaging application 335a running on the sending smartphone 110a to encrypt the unencrypted message 340a. The data encryption request includes the identity of the recipient of the unencrypted message 340a as specified by the user of the sending smartphone 110a. The data encryption request also includes the unencrypted message 340a. In step 410, the sender of the encryption request is authenticated by the server 130. In step 415, if the sender of the encryption request is not successfully authenticated, the process 401 ends at step 451. In step 415, if the sender of the encryption request is successfully authenticated, the process proceeds to step 420 in which a plurality of data keys are generated from a key management entity. In step 420, using the key generation engine 240, a plurality of data keys are received from a key management entity 243. The key management entity 243 is a third party entity that is separate and independent of the sending smartphone 110a and the server 130. In step 425a, an encryption key 370 is generated by the key generation engine 240 based on a first data key of the plurality of data keys received from the key management entity 243. In step 425b, the server 130 generates a header based on a second data key of the plurality of data keys received from the key management entity 243. The header is encoded with information about the allowed audience such as the identity of the recipient of the unencrypted message 340a as specified by the user of the sending smartphone 110a. In step 435, the client encryption system 241a encrypts the unencrypted message 340a using the encryption key 370. In step 445, the server 130 prepends the encoded header into the encrypted message to generate the encrypted data with encoded header 375. The encrypted message with encoded header 375 is transmitted to the messaging application 335a running on the sending smartphone 110a and the process 401 ends at step 451.

Figure 4B:
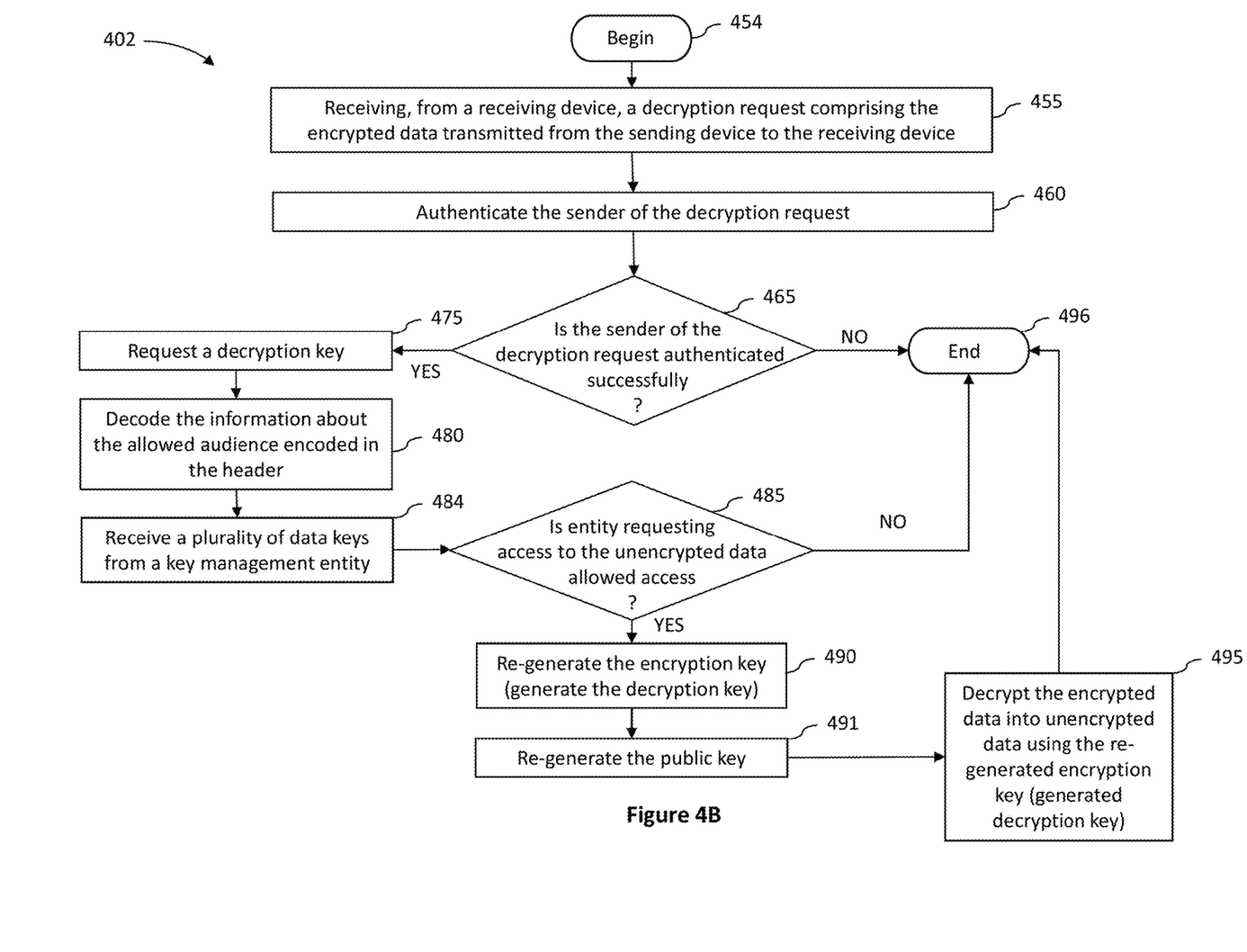
FIG. 4B sets forth an example process for decrypting encrypted data using the example end-to-end encryption system shown in FIG. 3.

FIG. 4B illustrates an exemplary process 402 for decrypting data using the exemplary clients 110a and 110b and the end-to-end encryption system of FIG. 3. While FIG. 4B is described with reference to FIG. 3, it should be noted that the process steps of FIG. 4B may be performed by other systems. The process 402 begins by proceeding from step 454 to step 455 when a data decryption request is received, from a receiving device, to decrypt encrypted data transmitted from a sending device to the receiving device. In step 460, the sender of the decryption request is authenticated. In step 465, if the sender of the decryption request is not successfully authenticated, the process 402 ends at step 496.

In step 465, if the sender of the decryption request is successfully authenticated, the process proceeds to step 470 in which the a decryption key is requested. In step 475, the information about the allowed audience is decoded. In step 484, using the key generation engine 240, a plurality of data keys is received from a key management entity 243. The key management entity 243 is a third party entity that is separate and independent of the receiving smartphone 110b and the key generation engine 240. In step 485, if the entity requesting the decryption key is allowed to access the unencrypted contents of the encrypted data then the process proceeds to step 490. In step 485, if the entity requesting decryption of the encrypted data is not allowed access to the unencrypted contents of the encrypted data then the process ends at step 496. In step 491, a decryption key is generated. In step 495, the encrypted data is decrypted into unencrypted data using the generated decryption key and the process 402 ends at step 496.

FIG. 4B sets forth an exemplary process for decrypting data using the example end-to-end encryption system shown in FIG. 3. An example will now be described using the exemplary process 402 of FIG. 4B, the end-to-end encryption system of FIG. 3, a sending smartphone as the exemplary client 110a and a receiving smartphone as the exemplary client 110b.

The process 402 begins by proceeding from step 454 to step 455 when the user of the receiving smartphone 110b receives an encrypted message with a header such as the encrypted data with encoded header 375. The encrypted message with encoded header 375 is received by the user of the receiving smartphone 110b from the user of the sending smartphone 110a via a messaging application 335b running on the receiving smartphone 110b. In step 455, a data decryption request is received by the client encryption system 241b from the messaging application 335b running on the receiving smartphone 110b to decrypt the encrypted message with encoded header 375. In step 460, the sender of the decryption request is authenticated. In step 465, if the sender of the decryption request is not successfully authenticated, the process 402 ends at step 496. In step 465, if the sender of the decryption request via the smartphone 110b is successfully authenticated, the process proceeds to step 475 in which the client encryption system 241b requests a decryption key. The client encryption system 241b transmits the decryption key request to the key generation engine 242 on the server 130. The decryption key request includes the encoded header. The server 130 receives the decryption key request that includes and encoded header. In step 484, the information about the allowed audience is decoded from the encoded header. The decoded information about the allowed audience includes the identity of the recipient of the encrypted message as specified by the user of the sending smartphone 110a when the user of the sending smartphone 110a composes the message via the messaging application 335a running on the sending smartphone 110a. In step 484, using the key generation engine 240, a plurality of data keys is received from a key management entity 243. The key management entity 243 is a third party entity that is separate and independent of the receiving smartphone 110b and the key generation engine 240. In step 485, if the user of the messaging application 335b running on the receiving smartphone 110b is not allowed access to the unencrypted contents of the encrypted message then the process ends at step 496. In step 485, if the user of the messaging application 335b running on the receiving smartphone 110b is allowed to access the unencrypted contents of the encrypted message then the process proceeds to step 490. Whether or not the user of the messaging application 335b running on the receiving smartphone 110b is allowed access to the unencrypted contents of the encrypted message is based on the decoded information about the allowed audience. In step 490, a decryption key 372 is generated by the key generation engine 240 based on at least one data key received from the key management entity 243. In step 491, a public key is generated based on at least one of the data keys received from the key management entity 243. The decryption key 372 and the public key are transmitted from the server 130 to the receiving smartphone 110b. In step 495, the client encryption system 241b on the receiving smartphone 110b decrypts the encrypted message into an unencrypted message 340b using the decryption key 372 (or re-generated encryption key) received by the receiving smartphone 110b from the server 130. The client encryption system 241b transmits the unencrypted message 340b the messaging application 335b running on the receiving smartphone 110b. The user of the receiving smartphone 110b accesses the contents of the unencrypted data 340b via the messaging application 335b running on the receiving smartphone 110b and the process 402 ends at step 496.

Hardware Overview

Figure 5:
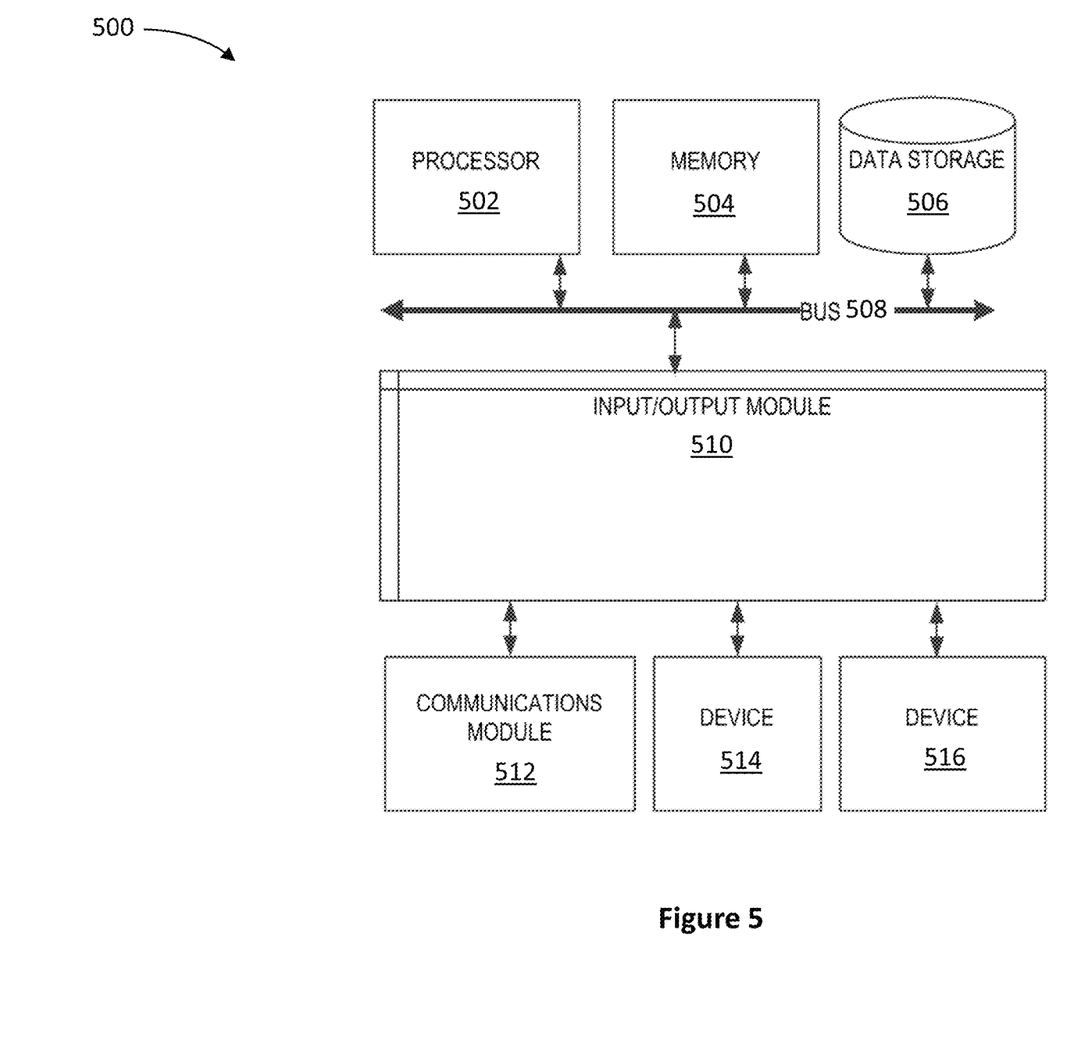
FIG. 5 is a block diagram illustrating an example computer system with which the example end-to-end encryption system in FIG. 2 can be implemented.

FIG. 5 is a block diagram illustrating an example computer system 500 with which clients 110 and servers 130 of FIGS. 2B and 3 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 232a and 232b), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., 238a and 238b) include networking interface cards, such as Ethernet cards and modems.

The components of the system can be interconnected by any form or medium of digital data communication, e.g., a communication network. The communication network (e.g., communication network 150) can include, for example, any one or more of a PAN, a (LAN), a CAN, a MAN, a (WAN, a BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the clients 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system [#6]00 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing end-to-end encryption of data between devices, comprising:
receiving, from a messaging application of a sending device, an encryption request comprising unencrypted data and information about an allowed audience comprising at least one of an identity of one or more entities or an identity of a group of entities that are allowed to access the unencrypted data, wherein each of the one or more entities or the group of entities that are allowed to access the unencrypted data is an application;
authenticating a sender of the encryption request;
in response to successfully authenticating the sender of the encryption request, generating an encryption key based on a first data key of a plurality of data keys received, from a key management entity in response to the encryption request, wherein the key management entity is a third party entity, separate and independent of an entity that generates the encryption key;
encrypting the unencrypted data into encrypted data using the encryption key;
encoding the information about the allowed audience into an encoded header of the encrypted data, including an identity of a recipient of the encrypted data;
receiving, from a messaging application of a receiving device, a decryption request comprising the encrypted data transmitted from the sending device to the receiving device;
authenticating a receiver of the decryption request;
in response to receiving the decryption request from the receiving device and successfully authenticating the receiver of the decryption request, decoding the information about the allowed audience encoded in the encrypted data, including the identity of the recipient of the encrypted data;
confirming that the receiver is allowed access to the unencrypted data based on the decoded information about the allowed audience, including the identity of the recipient of the encrypted data;
in response to confirming that the receiver is allowed access to the unencrypted data, re-generating the encryption key when the decoded information about the allowed audience indicates that an entity requesting decryption of the encrypted data through the receiving device is allowed access to the unencrypted data; and
decrypting the encrypted data into unencrypted data using the re-generated encryption key.

2. The computer-implemented method of claim 1, wherein the decoded information about the allowed audience in the encrypted data comprises an identity of a group of entities, the method further comprising:
in response to determining that the entity requesting access to the encrypted data is a member of the identified group of entities; and
if the decoded information about the allowed audience indicates that an entity requesting decryption of the encrypted data through the receiving device is allowed access to the unencrypted data, re-generating the encryption key.

3. The computer-implemented method of claim 1, wherein the entity requesting encryption of the unencrypted data is a user or an application.

4. The computer-implemented method of claim 1, wherein each entity of the group has an owner role or a publisher role and the entity requesting access to the encrypted data through the receiving device allowed access to the unencrypted data is a member of the group and the entity has a publisher role.

5. The computer-implemented method of claim 1, further comprising:
signing the unencrypted data using a signature of an entity that is requesting encryption of the unencrypted data by generating the signature based on generating a private key for the entity that is requesting encryption; and
verifying the unencrypted data that is decrypted from the encrypted data by generating a public key for the entity that is requesting decryption of the encrypted data and verifying the signature using the public key.

6. The computer-implemented method of claim 1, wherein the encryption key includes an expiration date indicating whether the encryption key is valid, the method further comprising:
encrypting the unencrypted data into encrypted data if the expiration data indicates that the encryption key is valid.

7. A system for secure end-to-end encryption between devices, comprising:
one or more processors;
a computer-readable storage medium coupled to the one or more processors, the computer-readable storage medium including instructions that, when executed by the one or more processors, cause the one or more processors to:
receive, from a messaging application of a sending device, an encryption request comprising unencrypted data and information about an allowed audience comprising at least one of an identity of one or more entities or an identity of a group of entities that are allowed to access the unencrypted data, wherein each of the one or more entities or the group of entities that are allowed to access the unencrypted data is an application;
authenticate a sender of the encryption request;
in response to successfully authenticating the sender of the encryption request, generate, an encryption key based on a first data key of a plurality of data keys received from a key management entity, wherein the key management entity is a third party entity that is separate and independent of the sending device and an entity that generates the encryption key;
encrypt the unencrypted data into encrypted data using the encryption key;
encode the information about the allowed audience into an encoded header of the encrypted data, including an identity of a recipient of the encrypted data;
receive, from a messaging application of a receiving device, a decryption request comprising the encrypted data transmitted from the sending device to the receiving device;
authenticate a receiver of the decryption request;
in response to receiving the decryption request from the receiving device and successfully authenticating the receiver of the decryption request, decode the information about the allowed audience encoded in the encrypted data, including the identity of the recipient of the encrypted data;
confirm that the receiver is allowed access to the unencrypted data based on the decoded information about the allowed audience, including the identity of the recipient of the encrypted data;
in response to confirming that the receiver is allowed access to the unencrypted data, re-generate the encryption key when the decoded information about the allowed audience indicates that an entity requesting decryption of the encrypted data through the receiving device is allowed access to the unencrypted data; and decrypt the encrypted data into unencrypted data using the re-generated encryption key.

8. The system of claim 7, wherein the decoded information about the allowed audience in the encrypted data comprises an identity of a group of entities and the instructions further cause the processor to:

re-generate the encryption key in response to determining that the entity requesting access to the encrypted data is a member of the identified group of entities and if the decoded information about the allowed audience indicates that an entity requesting decryption of the encrypted data through the receiving device is allowed access to the unencrypted data.

9. The system of claim 7, wherein the entity requesting encryption of the unencrypted data is a user or an application.

10. The system of claim 7, wherein each entity of the group has an owner role or a publisher role, the entity requesting access to the encrypted data through the receiving device allowed access to the unencrypted data is a member of the group and the entity has a publisher role.

11. The system of claim 7, wherein the instructions further cause the one or more processors to:

sign the unencrypted data using a signature of an entity that is requesting encryption of the unencrypted data, by generating the signature based on generating a private key for the entity that is requesting encryption; and verify the unencrypted data that is decrypted from the encrypted data by generating a public key for the entity that is requesting decryption of the encrypted data and verifying the signature using the public key.

12. The system of claim 7, wherein the encryption key includes an expiration date indicating whether the encryption key is valid and the instructions further cause the one or more processors to encrypt the unencrypted data into encrypted data if the expiration data indicates that the encryption key is valid.

13. A non-transitory machine-readable storage medium comprising machine-readable instructions that, when executed by a processor, cause the processor to perform operations, the operations comprising:

receiving, from a messaging application of a sending device, an encryption request comprising unencrypted data and information about an allowed audience comprising at least one of an identity of one or more entities or an identity of a group of entities that are allowed to access the unencrypted data, wherein each of the one or more entities or the group of entities that are allowed to access the unencrypted data is an application;

authenticating a sender of the encryption request;

in response to successfully authenticating the sender of the encryption request, generating, an encryption key based on a first data key of a plurality of data keys received, from a key management entity, wherein the key management entity is a third party entity that is separate and independent of an entity that generates the encryption key;

encrypting the unencrypted data into encrypted data using the encryption key;

encoding the information about the allowed audience into an encoded header of the encrypted data, including an identity of a recipient of the encrypted data;

receiving, from a messaging application of a receiving device, a decryption request comprising the encrypted data transmitted from the sending device to the receiving device;

authenticating a receiver of the decryption request;

in response to receiving the decryption request from the receiving device and successfully authenticating the receiver of the decryption request, decoding the information about the allowed audience encoded in the encrypted data, including the identity of the recipient of the encrypted data;

confirming that the receiver is allowed access to the unencrypted data based on the decoded information about the allowed audience, including the identity of the recipient of the encrypted data;

in response to confirming that the receiver is allowed access to the unencrypted data, re-generating the encryption key, when the decoded information about the allowed audience indicates that an entity requesting decryption of the encrypted data through the receiving device is allowed access to the unencrypted data; and decrypting the encrypted data into unencrypted data using the re-generated encryption key.

14. The non-transitory machine-readable storage medium of claim 13, wherein the decoded information about the allowed audience in the encrypted data comprises an identity of a group of entities and the operations further comprise:

re-generating the encryption key in response to determining that the entity requesting access to the encrypted data is a member of the identified group of entities and if the decoded information about the allowed audience indicates that an entity requesting decryption of the encrypted data through the receiving device is allowed access to the unencrypted data.

15. The non-transitory machine-readable storage medium of claim 13, wherein the entity requesting encryption of the unencrypted data is a user or an application.

16. The non-transitory machine-readable storage medium of claim 13, wherein each entity of the group has an owner role or a publisher role, the entity requesting access to the encrypted data through the receiving device allowed access to the unencrypted data is a member of the group and the entity has a publisher role.

17. The non-transitory machine-readable storage medium of claim 13, wherein the encryption key includes an expiration date indicating whether the encryption key is valid, the operations further comprising:

encrypting the unencrypted data into encrypted data if the expiration data indicates that the encryption key is valid.

* * * * *